US009067691B2

(12) United States Patent
Pugh et al.

(10) Patent No.: US 9,067,691 B2
(45) Date of Patent: Jun. 30, 2015

(54) TOW FOR AIRCRAFT

(75) Inventors: Charles R. Pugh, Astoria, OR (US); Donald C. Morrison, Tualatin, OR (US)

(73) Assignee: Lektro, Inc., Warrenton, OR (US)

( * ) Notice: Subject to any disclaimer, the term of this patent is extended or adjusted under 35 U.S.C. 154(b) by 0 days.

(21) Appl. No.: 13/429,236

(22) Filed: Mar. 23, 2012

(65) Prior Publication Data

US 2012/0271495 A1 Oct. 25, 2012

Related U.S. Application Data

(60) Provisional application No. 61/478,445, filed on Apr. 22, 2011, provisional application No. 61/526,614, filed on Aug. 23, 2011.

(51) Int. Cl.
*B60P 3/11* (2006.01)
*G06F 7/00* (2006.01)
*B60P 1/04* (2006.01)
*B64F 1/22* (2006.01)

(52) U.S. Cl.
CPC ...................................... *B64F 1/227* (2013.01)

(58) Field of Classification Search
CPC ...................................................... B64F 1/227
USPC ............. 701/22; 414/347, 458, 495, 680, 809
See application file for complete search history.

(56) References Cited

U.S. PATENT DOCUMENTS

| | | | |
|---|---|---|---|
| 4,036,384 A | 7/1977 | Johnson | |
| 4,113,041 A | 9/1978 | Birkeholm | |
| 4,955,777 A | 9/1990 | Ineson | |
| 5,150,860 A * | 9/1992 | Young | 244/63 |
| 5,151,003 A | 9/1992 | Zschoche | |
| 5,219,033 A | 6/1993 | Pollner et al. | |
| 5,261,778 A | 11/1993 | Zschoche | |
| 5,302,075 A * | 4/1994 | Zschoche | 414/428 |
| 5,516,252 A | 5/1996 | Francke et al. | |
| 5,680,125 A | 10/1997 | Elfstrom et al. | |
| 6,739,822 B2 | 5/2004 | Johansson | |

(Continued)

FOREIGN PATENT DOCUMENTS

GB 1 430 011 3/1976

OTHER PUBLICATIONS

International Search Report and Written Opinion dated Jun. 20, 2012, issued by the International Searching Authority in corresponding PCT Patent Application No. PCT/US2012/030450, filed Mar. 23, 2012.

*Primary Examiner* — Redhwan K Mawari
*Assistant Examiner* — Rodney P King
(74) *Attorney, Agent, or Firm* — Klarquist Sparkman, LLP (57) ABSTRACT

A tow vehicle for aircraft comprises a nose gear support assembly that can be raised and lowered relative to the vehicle. The support assembly can comprise a base portion and nose gear support portion pivotal about an upright axis relative to the base portion. Bearings can be positioned inwardly of the periphery of the support portion to support the support portion on the base portion. The bearings can be positioned partially in pockets provided in the base portion and in recesses in the support portion. A torque sensor can be coupled to the base portion and support portion to provide an output signal indicative of the torque between these components. An indicator, such as an alarm, can indicate when the torque exceeds first and second thresholds and can remain on if a second higher threshold is exceeded until, for example, an authorized individual turns off the indicator.

24 Claims, 10 Drawing Sheets

(56) References Cited

U.S. PATENT DOCUMENTS

| | | |
|---|---|---|
| 7,506,707 B2 | 3/2009 | Trujillo et al. |
| 2003/0095854 A1 | 5/2003 | Abela |
| 2003/0165375 A1* | 9/2003 | Johansson .................... 414/427 |
| 2005/0196256 A1 | 9/2005 | Rodenkirch et al. |
| 2008/0089766 A1 | 4/2008 | Hammonds |
| 2009/0040072 A1 | 2/2009 | Read et al. |
| 2010/0140392 A1 | 6/2010 | Perry et al. |

* cited by examiner

TOW FOR AIRCRAFT

CROSS REFERENCE TO RELATED APPLICATION

This application claims the benefit of U.S. Provisional Application Ser. No. 61/478,445, entitled TOW FOR AIRCRAFT, filed on Apr. 22, 2011, and of U.S. Provisional Application Ser. No. 61/526,614, entitled TOW FOR AIRCRAFT, filed on Aug. 23, 2011, both of which applications are incorporated by reference herein.

TECHNICAL FIELD

The disclosure relates to a tows vehicle for aircraft and to nose gear support assemblies for aircraft tow vehicles.

SUMMARY

In accordance with one embodiment, a tow for an aircraft comprises: a vehicle; an aircraft nose gear support assembly pivotally coupled to the vehicle for raising and lowering relative to the vehicle about a first pivot axis; at least one actuator coupled to the vehicle and to the nose support assembly and operable to raise and lower the nose gear assembly about the first pivot axis. In this embodiment, the nose gear support assembly comprises: a base portion; a support portion comprising a periphery and pivotally coupled to the base portion so as to be pivotal about an upright second pivot axis relative to the base portion; and a plurality of bearings positioned inwardly toward the second pivot axis from the periphery of the support portion and positioned to support the support portion on the base portion. The embodiment can also comprise a torque sensor coupled to the base portion and to the support portion and operable to sense the torque between the base portion and support portion and to provide a sensor output signal corresponding to the sensed torque and an indicator responsive to the sensor output signal to indicate a condition wherein the sensor output signal corresponds to a torque that is at least of a first magnitude.

In accordance with an aspect of an embodiment, the base portion can comprise plural bearing receiving pockets each positioned to receive a portion of a respective bearing and wherein the support portion comprises plural bearing receiving recesses each positioned to receive a portion of a respective bearing; whereby the plurality of bearings are received into respective base portion pockets and support portion recesses to thereby reduce the height of the combined base portion, bearings and support portion. The plurality of bearings can comprise roller bearings each pivotal about a respective bearing pivot axis, the bearing pivot axes being arranged to lie on radiuses extending through the second pivot axis. In addition, at least two of said bearings can be located along each of a plurality of radiuses. In one desirable embodiment, although not required as there can be bearings at or outside the periphery of the support portion, the only bearings supporting the support portion are positioned inwardly from the periphery.

In accordance with an embodiment, the base portion can comprise first and second plates, the pockets extending entirely through the first plate and the second plate closing the pockets from below. In addition, the support portion can comprise a turntable portion comprising third and fourth plates, the bearing receiving recesses extending entirely through the third plate and the fourth plate overlying the recesses. The bearings can also in one embodiment each comprise a bearing pivot pin mounted to the underside of the third plate.

In accordance with yet another embodiment, the indicator can provide a first alert signal in the event the sensor output signal corresponds to a torque of at least a first magnitude that is less than the torque of a second magnitude. The indicator can also provide a second alert signal in the event the sensor output signal corresponds to a torque of at least the second magnitude. In one form, the indicator can continue to provide the second alert signal following the reduction of torque indicated by the sensor output signal to correspond to a torque that is less than the second magnitude until the indicator is switched off by an individual who is authorized to switch off the indicator. In addition, in accordance with an embodiment, the indicator can be selectively turned on or turned off. As an aspect of and embodiment, the tow can comprise a nose gear holder and a nose gear coupler sensor coupled to the nose gear holder. The indicator in this embodiment can be automatically turned on in response to the nose gear coupler sensor indicating the absence of the nose gear coupler from the nose gear holder.

As a more specific embodiment, aspects of a tow for an aircraft having a nose gear can comprise a vehicle; an aircraft nose gear support assembly pivotally coupled to the vehicle for raising and lowering relative to the vehicle about a first pivot axis; and at least one actuator coupled to the vehicle and to the nose support assembly and operable to raise and lower the nose gear assembly about the first pivot axis. In this embodiment, the nose gear support assembly can comprise a base portion comprising first and second base side walls, a base rear wall and a base bottom portion extending between the first and second base side walls; a support portion comprising first and second support portion sidewalls, a support portion rear wall and a support portion bottom portion extending between the first and second support portion side walls, the support portion bottom portion comprising a periphery and being pivotally coupled to the base bottom portion so as to be pivotal about an upright second pivot axis relative to the base portion; and a plurality of bearings positioned inwardly toward the second pivot axis from the periphery of the support portion and positioned to support the support portion on the base portion. Also, the at least one actuator can comprise a first cylinder coupled to the vehicle and the first base sidewall and a second cylinder coupled to the vehicle and to the second base side wall. In addition, if provided, a torque sensor can be coupled to the base portion and to the support portion and operable to sense the torque between the base portion and support portion and to provide a sensor output signal corresponding to the sensed torque and an indicator can be provided that is responsive to the sensor output signal to indicate a condition wherein the sensor output signal corresponds to a torque that is at least of a first magnitude. As yet another aspect of this embodiment, the base bottom portion can comprise a first plate with plural bearing receiving pockets extending through the first plate and positioned to receive a portion of a respective bearing and a second plate closing off the pockets from below. Also, the support portion can comprise a third plate with plural bearing receiving recesses therethrough each positioned to receive a portion of a respective bearing and a fourth plate overlying the recesses. The plurality of bearings can be received into respective base portion pockets and support portion recesses to thereby reduce the height of the combined base portion, bearings and support portion. In addition, the plurality of bearings can comprise roller bearings each pivotal about a respective bearing pivot axis, the bearing pivot axes being arranged to lie on radiuses extending through the second pivot axis. Also, as a further aspect, the indicator can provide a first alert signal in the event the sensor output signal corresponds to a torque of at least a first magnitude that is less than the torque of a second magnitude, the indicator providing a second alert signal in the event the sensor output signal corresponds to a torque of at least the second magnitude.

As yet another aspect of an embodiment, the tow can comprise a winch mounted to the vehicle and comprising a winch strap for engaging the nose gear of the aircraft to roll the nose gear onto the upper surface of the fourth plate prior to raising the nose gear assembly.

These and other aspects of the developments disclosed herein will become more apparent from the drawings and description below.

DETAILED DESCRIPTION

Figure 1:
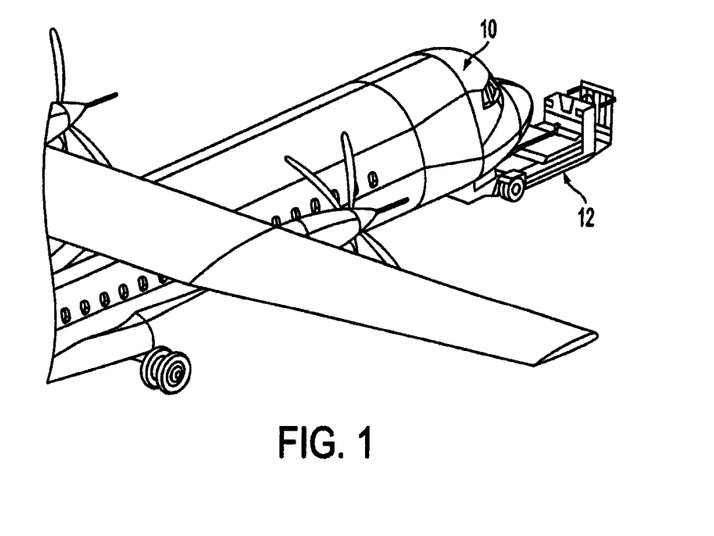
FIG. 1 illustrates an exemplary aircraft being towed by one embodiment of tow vehicle 12.
Figure 2:
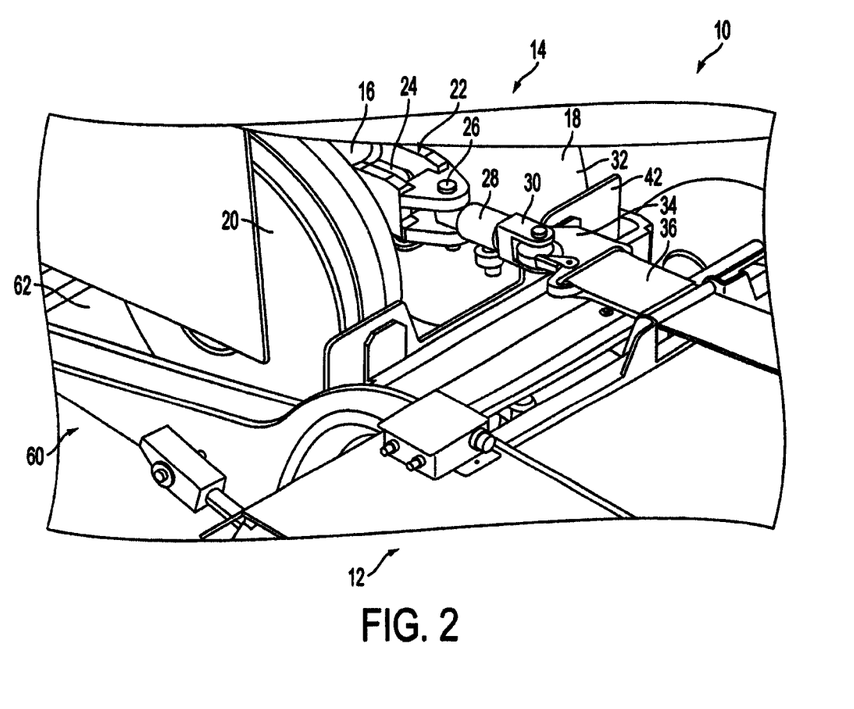
FIG. 2 is an enlarged view of the wheels of an aircraft shown positioned on a nose gear support portion of the tow vehicle.
Figure 3:
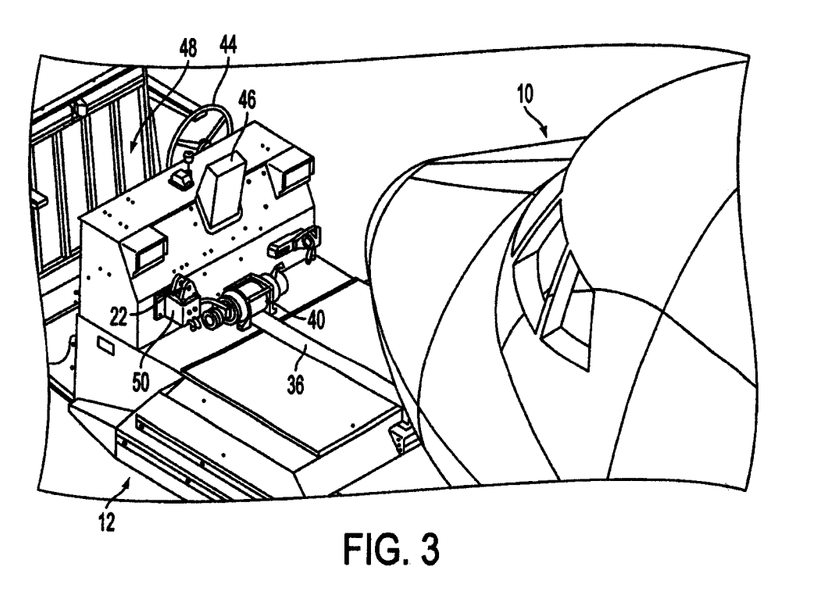
FIG. 3 is a perspective view of the tow vehicle of FIG. 1 looking toward the operator compartment area of the tow vehicle.

With reference to FIGS. 1-3, an airplane 10 is shown being towed by an aircraft tow vehicle 12 such as in the form of a towbarless tow vehicle (TLTV). As can be seen from FIG. 2, the nose gear 14 of the aircraft in one example has an upright support 16 that pivots about an upright or vertical axis. Support 16 carries a horizontal axle to which first and second wheels 18, 20 are rotatably mounted. When the pivot support 16 is released, the wheels 18, 20 can be turned by turning the nose gear. In FIG. 2, a nose gear interface tool or towing adapter 22 is shown hooked to a towing element 24 at the front of the pivot 16. Adapter element 22 pivotally supports a pin 26 coupled by a bar 28 to a clevis 30 that supports another upright pin 32. A hook 34 is shown engaging pin 32. Hook 34 is coupled to a strap 36 operated by a winch (not shown in FIG. 2 but indicated by the number 40 in FIG. 3). Operation of the winch pulls the captured nose gear onto a cradle assembly 60 and more specifically onto the upper surface 62 of a top plate. A winch shutoff, such as a plate 42 pivotally mounted to the cradle assembly 60, can be coupled by a switch to a winch controller. Upon contact of the shutoff plate 42 by the wheels 18, 20, the switch operates to turn off the winch.

With reference to FIG. 3, a steering wheel 44 is shown for steering the rear wheels (not shown) of the tow vehicle. In addition, a warning/alarm system 46 is shown mounted to the tow vehicle in a location where it is visible to an operator of the tow vehicle who is positioned in the operator compartment area 48 of the TLTV. A towing adapter stowing rack or bracket 50 is shown mounted to the TLTV for receiving the towing adapter 22 when not being used to tow an aircraft. Note, housing 50 would be empty if the illustrated adapter 22 were being used to tow the plane 10.

With reference to FIGS. 4-10, various aspects of embodiments of the cradle assembly will be understood with reference to the following description.

Figure 4:
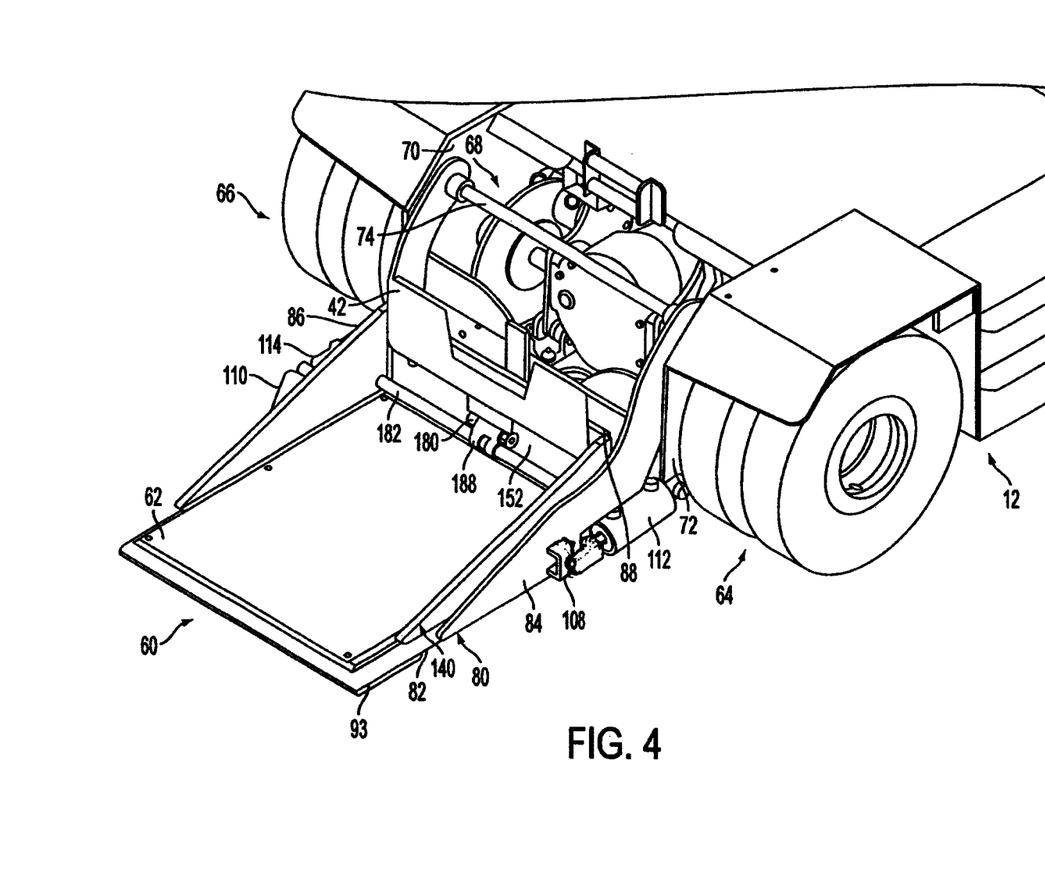
FIG. 4 is a perspective view of one embodiment of a nose gear support assembly of a tow vehicle.

With reference to FIG. 4, the front portion of an exemplary TLTV 12 is illustrated in greater detail. The front portion of the TLTV is supported by first and second sets of tandem drive wheels 64, 66 with a wheel well 68 therebetween. The wheel well is bounded by respective wheel well side members, such as wheel well side plates 70, 72. A pivot, such as a pivot pin 74, extends between side plates 70, 72 at an elevation above the axle about which the wheels 64, 66 pivot.

One form of a cradle assembly 60 comprises a cradle or support portion 80 and a turntable portion 140 carried by the cradle portion with a torque measurement mechanism or torque measure, such as a load cell (not shown in FIG. 4) coupling the turntable portion 140 to the cradle portion 80. The load cell can measure the strain or load between these portions 80, 140 and thereby the torque being placed on the nose gear of a plane as the TLTV is being steered. Under normal towing conditions, this torque is minimal. However, if the nose gear is turned too far in either direction, in some types of aircraft the nose gear will hit a stop with any further attempt to turn the TLTV resulting in excessive torque being applied to the nose gear. Also, if the aircraft operator (pilot) has failed to release the nose gear pivot 16 (e.g., the nose gear pivot is left in a locked position for steering by the aircraft's steering system), then turning of the TLTV will result in torque being applied to the nose gear. If too much torque is applied to the nose gear, the nose gear can be damaged. In addition, a nose gear that has been subjected to excessive torque, for example torque exceeding a maximum threshold, should be inspected before the plane is again flown.

Figure 5:
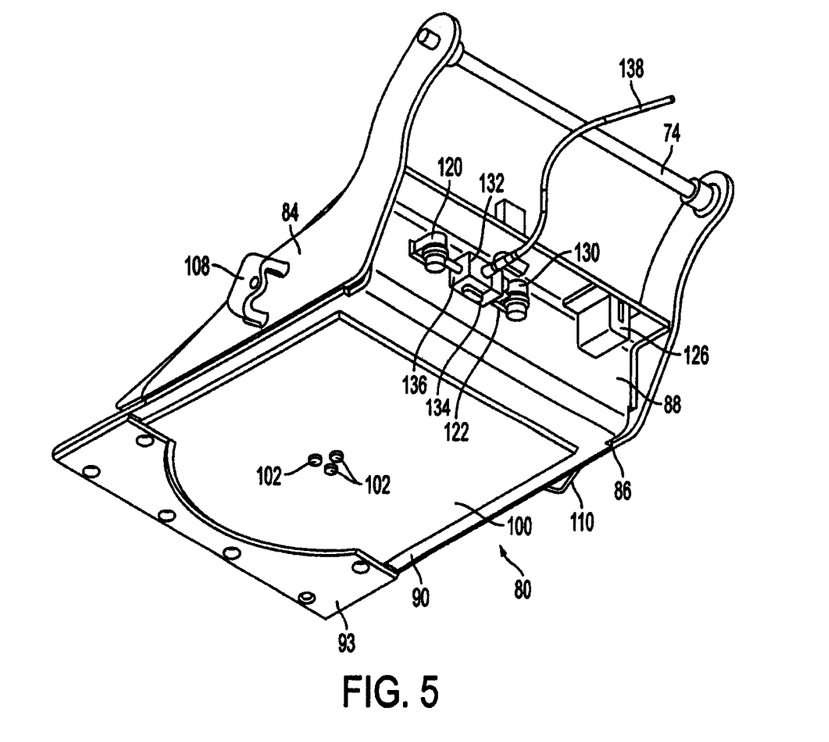
FIG. 5 is bottom perspective view of a cradle portion of the nose gear support assembly.
Figure 6:
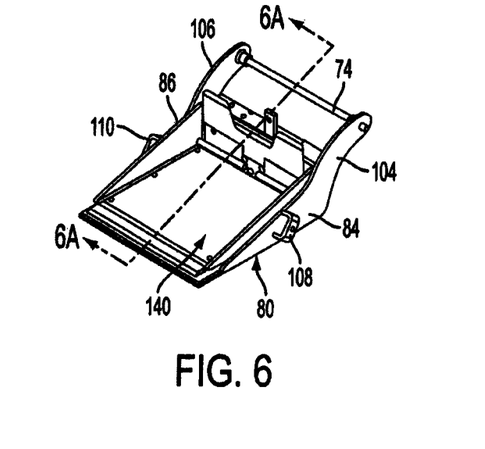
FIG. 6 is a top perspective view of the nose gear support assembly.
Figure 6A:
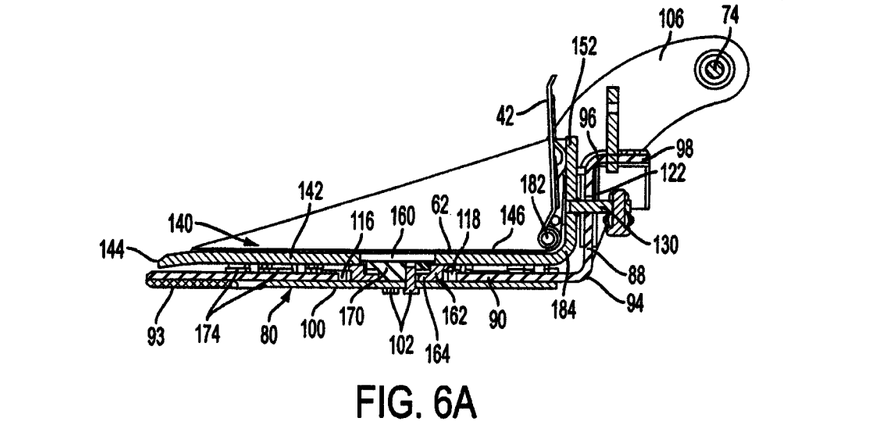
FIG. 6A is a vertical sectional view of the nose gear support assembly of FIG. 6 taken along line 6A-6A of FIG. 6.

With reference to FIGS. 4-6A, one form of cradle or support 80 comprises a base portion 82, first and second side portions 84, 86 and a back or rear portion 88 extending between the side portions. The cradle side portions can be reinforced to accommodate heavier aircraft. For example, side portions 84, 86 can each comprise plural plates held together as by welding, by upper and lower reinforcing cross members. As best seen in FIG. 6A, the base portion 82 can comprise a generally horizontal base plate portion 90 with a central opening 92. Toward the rear of plate 90, the plate can turn upwardly, such as at location 94, with the back portion 88 comprising an upright wall portion of this plate. In addition, the plate 90 can be turned rearwardly, such as at a location 96 at the upper end of back portion 88, to form a component supporting and protecting flange 98. A lower central member or portion, such as a lower plate 100, of cradle 80 can be secured using bolts or other fasteners to the cradle assembly as described below. In addition, a wear plate 93 can be bolted or otherwise fastened to the undersurface of plate 90 at the forward end or edge of this plate 90.

Referring to FIGS. 5 and 6, the side portions 84, 86 of the cradle can have upwardly extending portions, such as arms 104, 106, that extend to a location above the nose gear supporting portion of the cradle assembly. The pin 74 is shown extending between upper end portions of the arms 104, 106 with stub ends of the pin being shown in FIG. 6 that can engage and pivot within receptacles in the side plates 72, 74 of the wheel well.

An actuator is provided for pivoting the nose gear support assembly about the transverse pivot axis defined by the pin 74. The actuator can comprise any suitable mechanism for raising and lowering the nose gear assembly about the pivot axis. For example, plural actuating cylinders can be used as explained below. Exemplary actuating cylinder connecting brackets 108, 110 are shown mounted to the respective exterior surfaces of cradle side portions 84, 86 in FIG. 6. Alternative cylinder connecting members can be used, such as a connection block supported by flanges projecting outwardly from the cradle side portions both above and below the connection block. As can be seen in FIG. 4, actuating cylinders 112, 113 extend between the TLTV chassis and the cradle lugs or brackets 108, 110 (with clevis connections being used as desired). In this example, extension of these cylinders pivots the cradle assembly about the axis of pin 74 to raise the cradle assembly (and thus raise an aircraft nose gear positioned in the cradle) and retraction of the cylinders (such as shown in the retracted position in FIG. 4) lowers the cradle assembly.

Figure 7:
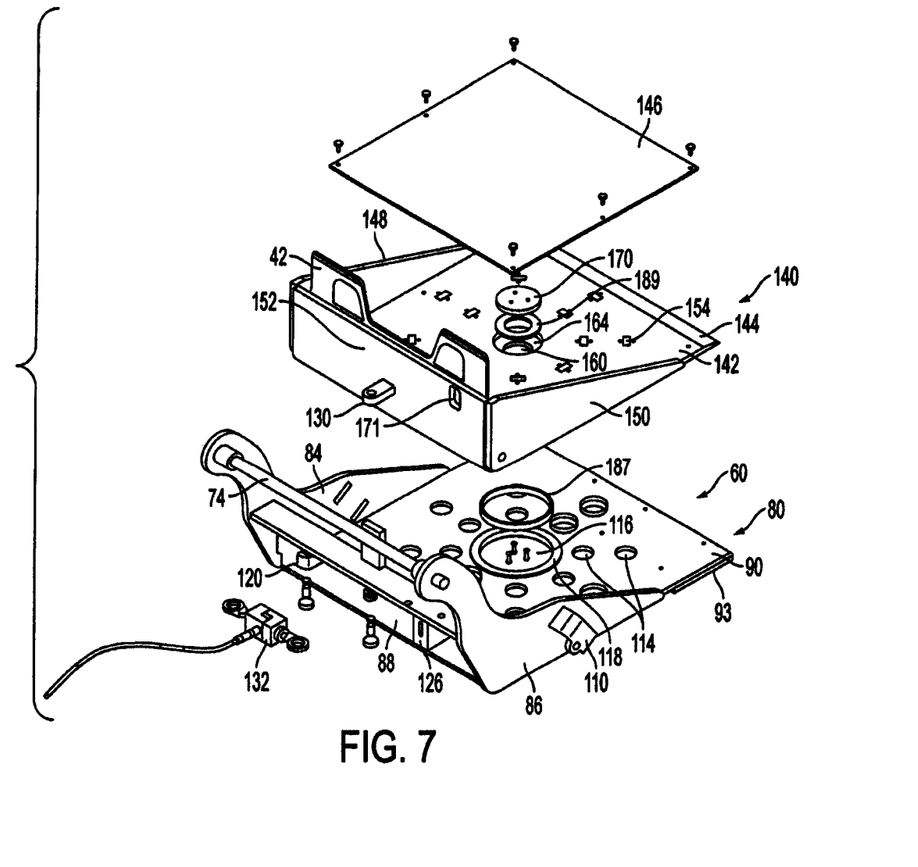
FIG. 7 is an exploded perspective view, looking generally downwardly, of an embodiment of a nose gear support assembly.
Figure 8:
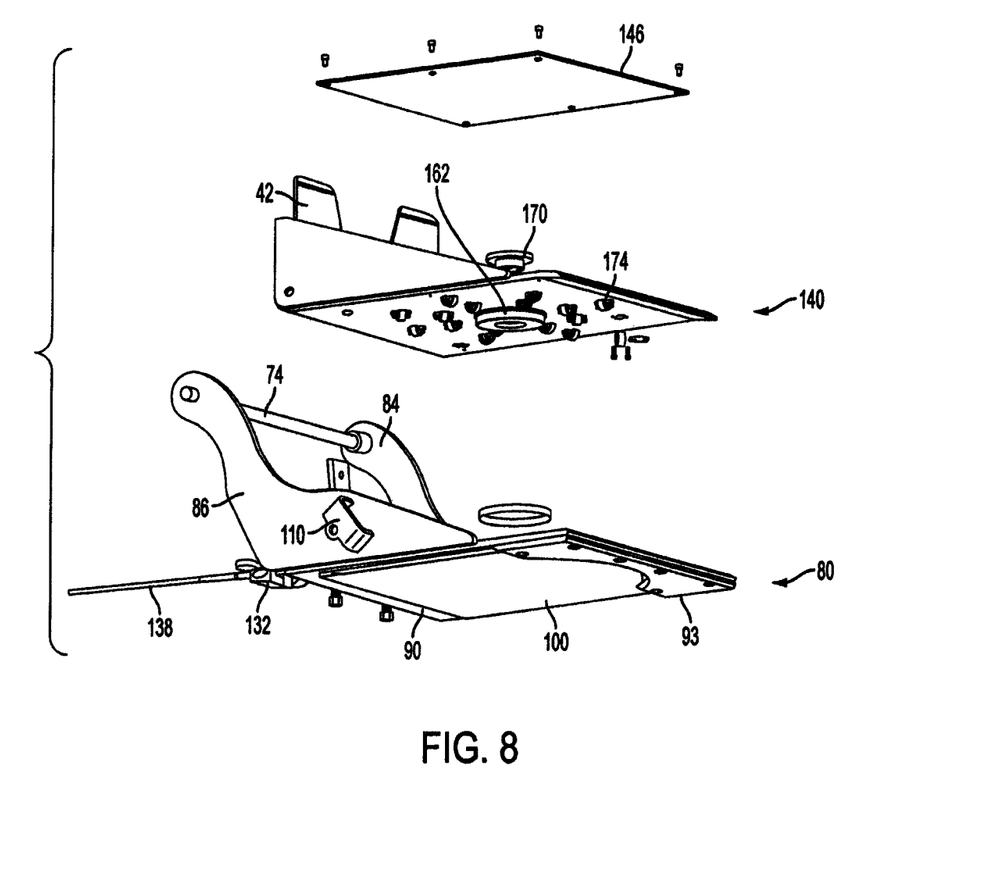
FIG. 8 is an exploded perspective view, looking generally upwardly, of the nose gear support assembly embodiment of FIG. 7.

As can be seen in FIG. 7, the illustrated base portion, in this example the base plate 90 is provided with a plurality of bearing receiving pockets or openings, in this case extending through the plate 90 with some of these openings being indicated by the number 114 in FIG. 7. These openings 114 surround an enlarged center opening 116 in plate 90. The center opening 116 receives a turntable receiver 118 that defines an interior circular wall for guiding the pivoting of the turntable about an upright pivot axis through the center of the receiver 118. Respective bearing receiving pockets or openings 114 in the embodiment of FIG. 7 are shown. These pockets can extend entirely through the plate 90 or only partially into the plate. In this embodiment of FIG. 7 (as best seen in FIG. 8), a cover 100 covers the pockets 90 that pass through the support 90. The bases of the pockets are desirably made of hard material, such as hardened steel to resist wear. For example, hardened steel inserts can be placed in the bottom of the pockets to provide a bearing surface for bearings received in the pockets. The bearing surfaces are desirably positioned below the upper end of these respective pockets. The illustrated pockets are shown with their centers positioned to receive bearings positioned on radiuses from the turntable pivot axis on respective lines that pass through the center point of the receiver 118. That is, the pockets 114 in this example are on respective radiuses from the center of the receiver 118. In addition, in the embodiment of FIG. 7, a plurality of said support pockets at one side of the receiver center are aligned with corresponding pockets at the opposite side of the receiver center. For example, plural sets of four aligned pockets are shown in FIG. 7 with two pockets of each set being at one side of the center of the opening of receiver 118 and two pockets of the set being at the opposite side of the center of the opening of receiver 118. That is, in FIG. 7 there are four of said sets of four pockets. In addition, there are also two sets of two pockets generally diagonally disposed across the plate 90 with one pocket of a diagonally disposed set being at one side of the center of receiver 118 and the other pocket of the diagonally disposed set being at the opposite side of the center of the receiver 118. Other arrangements of pockets can be used. However, radially disposed pockets are desirable. These pockets define respective bearing receiving recesses that can receive a respective bearing, such as mounted to the turntable that extends into the associated pocket.

As can also be seen in FIG. 7, a lug 120 mounted to the rear wall 88 of the cradle projects rearwardly of the rear wall. In addition, a lug receiving passageway 122 is shown extending through rear wall portion 88 of cradle 80. A lug 130 coupled to the turntable can pass with the opening 122 with the opening 122 being enlarged to permit or allow movement of the lug passing therethrough toward and away from the lug 120. A load cell can be attached between these two lugs to measure the strain or load between the turntable portion 140 and cradle portion 80. In addition, an opening 171 (FIG. 7) is shown passing through rear wall portion 88. A switch actuator, such as a micro-switch actuating pin or a rod can pass from the shutoff plate 42 (FIG. 4) through this opening to engage a switch to turn off the winch when the shut off plate is engaged by the nose wheels. The winch shut off can be configured to respond to contact between the cradle assembly and alternative portions of the nose gear other than the wheels. Also, other position sensors or mechanisms that sense the position of the nose gear relative to the cradle assembly can be used to control the winch. Less desirably, the winch can be stopped using manual controls under the control of a tow operator. The switch can comprise a microswitch, such as is shown for example at 126 in FIG. 5. In addition, the lug 130 from the turntable is shown passing through the opening 122 in FIG. 5. A load cell 132 is also shown in FIG. 5 with a first load cell portion 134 coupled to lug 130 and a second load cell portion 136 coupled to lug 120. Load cell 132 is conventional and provides a signal such as an electrical signal along a line 138 corresponding to the load between the load cell components 134, 136 such as corresponding to the strain between these components. The signal along line 138 can be, for example, in millivolts with the magnitude of the signal corresponding to the level of the load between these components and thereby indicating the torque between the turntable and cradle and applied to the nose gear. In addition, other forms of load or torque sensors can alternatively be used for detecting the torque between the turntable 140 and the cradle 80.

The turntable assembly 140 in one illustrated form is best seen in FIGS. 6-9. The illustrated turntable assembly comprises a base portion, such as a base plate portion 142 having a downturned front edge 144 with a cover plate 146 mounted to the base plate 142. The upper surface of the cover plate 146 can comprise the upper turntable surface 62 in FIG. 4. As can be seen in FIG. 7, the illustrated turntable can further comprise first and second side portions such as side walls 148, 150 and a rear portion such as a rear wall 152 extending between the rear edges of the side walls 148, 150. A pattern of bearing receiving openings, one of which is numbered as 154 in FIG. 7, is also provided with the pattern of these openings 154 desirably overlaying and thereby corresponding to or matching the openings 114 in the cradle plate 90 as shown in FIG. 7. These openings 154 can extend through the plate 142 to provide clearance for bearings mounted to the underside of the plate 142. The opposed openings 114, 154 can thus accommodate or receive a bearing positioned therebetween and also lower the profile of the cradle. This lower profile reduces the force required by a winch to pull the nose gear of the aircraft onto the top surface of the nose gear assembly. The bearings can comprise various types of bearings. However, in one desirable form, the bearings can comprise roller bearings having axes aligned along radiuses from the center of the opening of receiver 118 (FIG. 9) of the cradle and the center of a circular opening 160 through the plate 142. An annular centering element, such as a ring 162 can be mounted, such as by welding, to the undersurface of plate 142. The illustrated ring 162 is received within the opening of receiver 118 (FIGS. 6A, 7) with the receiver 118 of FIG. 7 permitting the pivoting of the turntable about an axis passing through the center of annular member 162 (and in the example through the center of the opening 160) and the center of the opening of receiver 118. The ring 162 is also shown in FIG. 6A. The ring 162 can be stepped inwardly to form an annular lip or shelf 164 (see FIG. 6). A retainer 170 (see FIG. 6A) can be positioned in ring 162 and secured by fasteners 102 that pass through plate member 100 and into the retainer to retain the turntable portion assembled to the cradle portion with bearings 174 (see, for example, FIG. 6A) being disposed at least partially between turntable plate 142 and the cradle plate 90.

Figure 9:
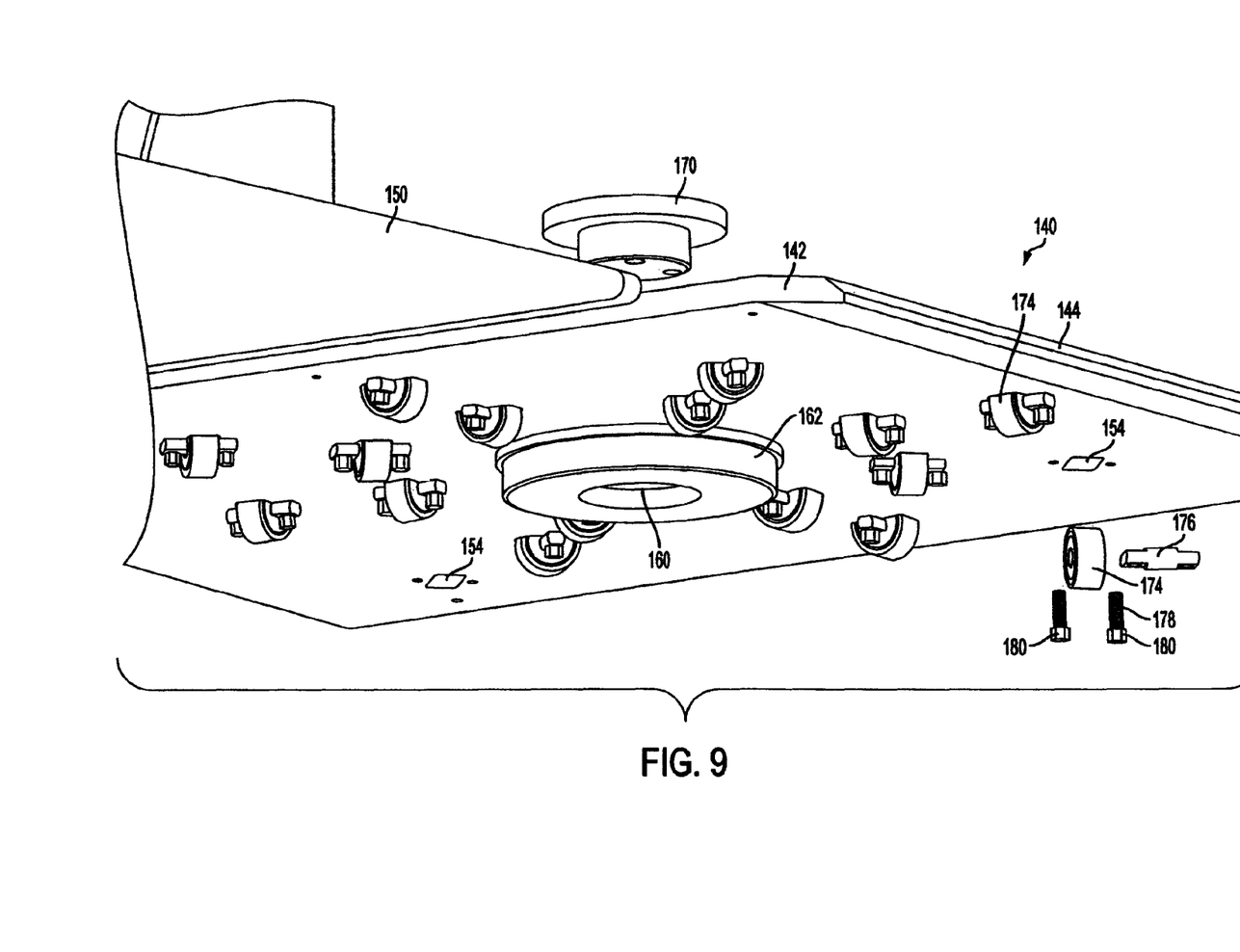
FIG. 9 is an enlarged view of a turntable portion of the nose gear support assembly of the embodiment of FIG. 8.
Figure 10:
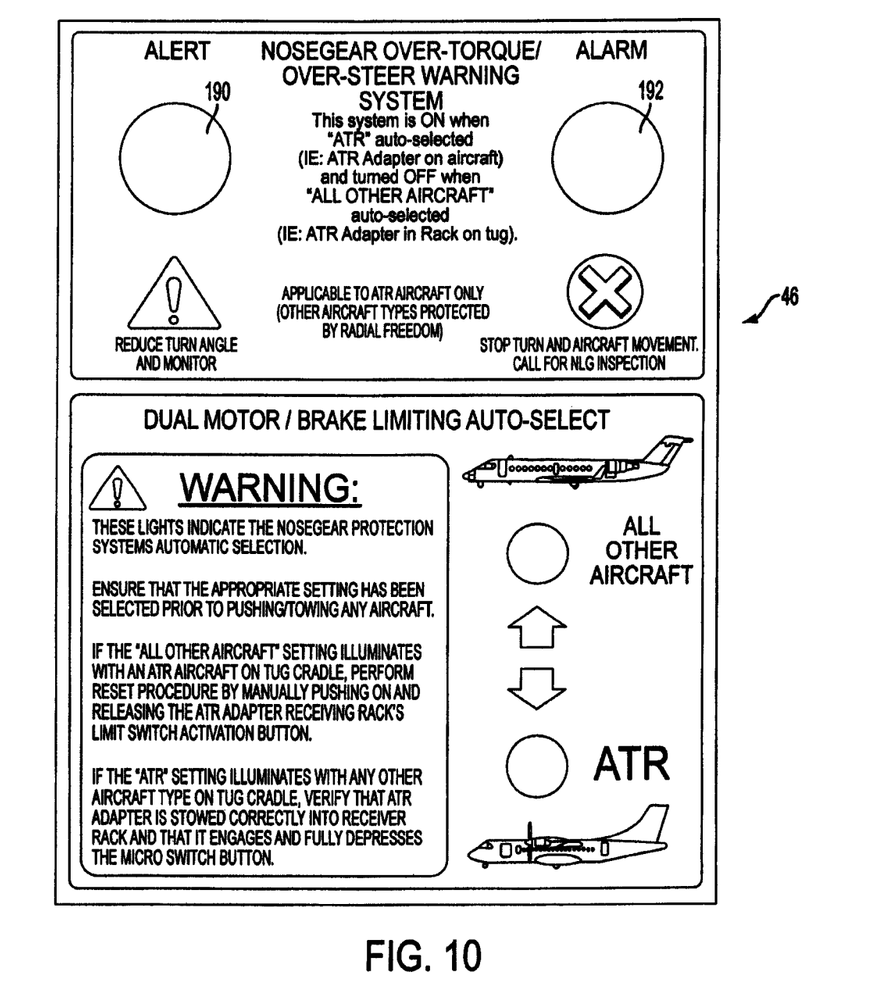
FIG. 10 illustrates an exemplary warning system for a tow vehicle with a nose gear support assembly.

As can be seen in FIG. 9, the bearings 174 can comprise roller bearings each rotatable about the axis of a respective support pin 176 with the support pin being secured by fasteners, such as screws or bolts 178, 180, to the undersurface of the plate 142. Alternatively, the bearings can be secured to the upper surface of plate 90 or otherwise positioned between the turntable and the cradle portions. Desirably, the turntable is supported by plural bearings in the field of the turntable (spaced from the peripheries of the plates 90, 142) to distribute the weight rather than just being supported at the edges of a turntable. Also, the turntable can be rectangular or of an alternative geometric shape and does not have to be circular. The axes of the pins 176 are desirably aligned along radiuses extending from the center of the ring 162 so as to minimize friction between the turntable and cradle. As a result, the load on a load cell, indicating the torque between the turntable portion 140 and cradle portion 80, accurately reflects the torque being applied to the nose gear of the aircraft. The load cell can be calibrated to ignore the minimal torque arising from turning of an empty turntable portion relative to the cradle portion.

In FIG. 9, there are eight rows of two bearings per row with each row being positioned along a radius from the center of opening 160. In this example, the rows are spaced forty five degrees apart with two rows being parallel to the front edge of plate 142 and two rows being parallel to the side edges of plate 142. This arrangement can be varied. In an alternative construction for heavier aircraft, such as a Boeing 737 aircraft where a 25,000 pound load can be placed on the aircraft nose wheels, more bearings can be used. For example, the plate 142 can be elongated in width and be provided with ten rows of radially positioned bearings, with, for example, three rows of three bearings each extending from the center of the opening 160 toward the first side edge of member 142, three such rows of three bearings extending toward the second side edge of member 142, two such rows of two bearings extending toward the front of member 142, and two such rows of two bearings extending toward the rear of member 142. The rows of bearings need not be equally spaced as, for example, more bearings can be placed toward the sides of the member 142 than toward the front and rear center portions of the member 142. In the case of heavier aircraft, heavier duty components can be used in the tow and nose gear support assemblies to support the added weight.

Referring to FIGS. 4, 6A, a pin or rod 182 is shown inserted at the base of the rear wall 152 of the turntable near the intersection of the rear wall 152 with the turntable base plate 142. As can be seen in FIG. 6A, the turntable base plate 142 can be turned upwardly at a location 184 so that the base plate 142 and rear wall 152 are of one piece.

As can be seen in FIG. 4, the winch stop plate 42 can be pivoted by a pin 186 to the rear wall 152 of the turntable portion. In addition, a return spring flange 188 can be connected to pin 186 and positioned to engage the pin 182. The spring flange 188 biases the stop plate away from the rear wall of the cradle and thus away from a winch stop position.

Referring again to FIG. 7, a turntable lug 130 is shown projecting rearwardly from the rear wall 152 of the turntable assembly 140. In addition, an opening 171 is shown through the rear wall 152 through which a switch activating pin or rod coupling the shutoff plate 42 to a shut off switch can pass.

Although not all the figures have been referred to in detail, components discussed above in these other figures have been assigned the same numbers as previously discussed. It should be noted that the number of bearings that are utilized to support the turntable can be varied with the capacity of the turntable. That is, a larger number of bearings can be included for turntables that are to handle larger aircraft. In addition, forms of bearings other than roller bearings can be used. Also, friction reducing bushings or components can be included between selected components as desired. Two such bushings are shown at 187, 189 in FIG. 7.

In operation, a tow adapter 22 is detachably connected to the nose gear of an aircraft to be towed. In addition, the winch strap is hooked to the tow adapter and the winch is operated to pull the nose gear onto the turntable of the cradle assembly. Once the nose gear is in the desired position on the turntable, the shutoff plate 142 turns off the winch, with the winch strap remaining attached to retain the nose gear on the cradle assembly. As the TLTV is steered during towing of the aircraft, the load cell measures the torque between the turntable and the cradle and provides a signal corresponding to the measured torque. The turntable typically moves very little relative to cradle as once the minimal clearance of a typical load cell is taken up, the load cell elements limit further relative motion. The signal can be provided to a programmable logic controller to activate warning signals (for example visual and/or audio signals) and alarm signals depending upon the level of the measured load. For example, if a detected signal reaches a level corresponds to torque on the nose gear that is at a predetermined threshold below a maximum allowable torque on the nose gear for a given type of aircraft, the controller can activate a warning signal. For example, a relay can be closed to deliver current to a warning light. With reference to FIG. 15, in one example an amber light 190 can flash to provide an alert to the operator that this first torque level has been reached. The first torque level threshold can be varied. Also, warnings (for example different warning signals) can be provided at more than one such pre-maximum torque level. An audible sound can also be provided (e.g. the controller can operate a relay to energize an audible alert signal). If the operator reduces the torque (e.g. by lessening the steering angle of the nose gear) below the low threshold, the alert can be turned off. In contrast, if the operator ignores this alert signal or alert signals and the nose gear is turned to an extent that the torque equals or exceeds the allowable maximum torque on the nose gear, an alarm can be activated. For example, the controller can operate another relay or relays to actuate one or more of these latter alarms. The maximum torque alarm can comprise an audio and/or a visual signal. In one desirable form, the alarm comprises a flashing red light 192 and a beeping audio alarm. Desirably the system operates such that the TLTV operator cannot turn off the maximum torque alarm if this upper torque limit is reached or exceeded. For example, turning off the maximum torque alarm can require the use of a key or other shutoff device under the control of an authorized individual, such as a supervisor. The authorized individual can call for an inspection of the aircraft nose gear if the maximum torque level (such as a maximum torque threshold) is reached or exceeded and resulted in the production of the maximum torque alarm. Thus, the operator cannot simply reduce the torque on the nose gear after this maximum torque level is reached to shut off the alarm that indicates that the nose gear should be inspected. Some aircraft have nose gears that are free to turn without limit and thus an alarm would be unnecessary for such an aircraft. In contrast, aircraft that limit the movement of the nose gear, such as ATR aircraft, desirably employ the torque monitoring method disclosed herein.

In one specific approach, a supervisor can turn on the system to monitor torque whenever an aircraft requiring torque monitoring is being towed. This can be accomplished remotely or otherwise. In one desirable embodiment, a particular nose gear interface or adapter is used for aircraft of the type for which nose gear torque is to be monitored. A switch can be included in the holder 50 (FIG. 3) that is activated whenever this nose gear interface or adapter is removed from the holder to automatically turn on the torque monitoring system when the nose gear adapter is removed. The system can then be turned off when the nose gear adapter is again stowed in the housing. However, the alarm is desirably operable independently of the return of the adapter so that the maximum torque alarm, once started, continues whether the adapter has been returned to the housing until turned off by someone with the key or other alarm controller.

An automatic sensor can be used to determine the type of aircraft that is being carried by the nose gear support assembly. Semiautomatic (i.e., an operator inputting the type of aircraft and the system determining the type of aircraft from the input) determination of the type of aircraft can be used. From the determined type of aircraft, the maximum torque levels can be set and the alarm can be activated if the type of aircraft is one that torque limits can be exceeded. In one example, one or more load sensors such as load cells can be placed on the cradle or the actuating cylinders to determine the weight of the aircraft nose gear on the cradle. In another example, the load sensors can comprise a mechanism for determining the pressure in a hydraulic fluid line or cylinder that is required to lift an airplane, the pressure being used to calculate or indicate (such as at a pressure sensor output) the weight of an airplane on the cradle. From a signal representing the weight, the aircraft type can be determined (e.g., by a processor using a lookup table) and the torque level or levels can be set based on this determination. In addition, the braking pressure applied to the tow can be limited in response to the aircraft weight representing signal to fall within one of a plurality of ranges (such as four ranges) based upon the aircraft weight. Also, the current available (in an electric motor driven tow) to accelerate the tow can be limited in response to the signal representing weight to fall within one of a plurality of ranges (such as four ranges) based upon the aircraft weight. These ranges can be defined as from zero to a maximum magnitude with the maximum magnitude being different for each range. One or more programmable controllers and/or hardwired circuits can be coupled to the motor drive circuit and brake pressure applicator (e.g., a hydraulic disc brake cylinder or applicator) to limit the drive current and the brake pressure to fall within the desired range (e.g., less than the maximum for a range) for the aircraft weight. A higher braking force range can be allowed and a higher drive current range can be allowed for a heavier aircraft. The available range can optionally be set based upon whether the adapter is removed from the holder. For example, the lowest current and braking force range can be selected if the adapter is removed. An override can also be provided to allow the tow operator to select a different range. Thus, the tow can comprise a load sensor coupled to the nose gear turntable support assembly and operable to provide an output signal representing the weight of an aircraft carried by the nose gear support assembly, the tow comprising an electric motor operable to drive the tow to move the aircraft in response to drive current, the tow also comprising at least one brake (and desirably at least two opposed wheels having a brake) operable to apply a braking force to the tow to decelerate the tow, a controller having an input coupled to load sensor and to the output signal representing the weight of the aircraft carried by the nose gear support assembly. The controller can be operable to limit the maximum drive current and the maximum braking force to one of a plurality of maximum magnitudes based on the weight of the aircraft. Desirably there are at least four of said maximum drive current and maximum braking force magnitudes. Also, the tow of this alternative embodiment can comprise a nose gear holder, a nose gear coupler sensor coupled to the nose gear holder, and wherein the nose gear coupler sensor provides an output signal indicating the absence of the nose gear from the nose gear holder. The controller can be coupled to the nose gear coupler sensor and operable to set the maximum braking pressure to its lowest maximum magnitude and the maximum braking pressure to its lowest maximum level in response to the absence of the nose gear from the nose gear holder. Alternatively, a proximity sensor can also be used on the cradle to determine the aircraft tire size and provide a signal indicating the tire size from which a processor can determine the type of aircraft and set the torque levels.

The term "and/or" in this disclosure means "and", "or" and both "and" and "or". The term "coupled" in this disclosure includes direct connection of elements and also includes the indirect connection of elements through one or more other elements. The singular terms "a" and "an" also include the plural. For example, if two of a particular element are present, there is also "an" or "a" of such element that is present.

Having illustrated and described the principles of these developments with reference to a number of embodiments, it should be apparent to those of ordinary skill in the art that the described embodiments can be modified in arrangement and detail without departing from the inventive principles described herein. For example, components described as plates can be other than plate like in form. We claim as our invention all such developments that fall within the spirit and scope of the described embodiments and inventive concepts disclosed herein. All nonobvious and novel components and subcombinations and combinations thereof are within the scope of the invention disclosed herein.

We claim:

1. A tow for an aircraft having a nose gear comprising:
a vehicle;
an aircraft nose gear support assembly pivotally coupled to the vehicle for raising and lowering relative to the vehicle about a first pivot axis;
at least one actuator coupled to the vehicle and to the nose support assembly and operable to raise and lower the nose gear assembly about the first pivot axis;
the nose gear support assembly comprising;
  a base portion;
  a support portion comprising a periphery and a support surface on which the nose gear of the aircraft is positioned during towing, wherein the support portion is pivotally coupled to the base portion so as to be pivotal about an upright second pivot axis relative to the base portion; and
  a plurality of bearings positioned inwardly toward the second pivot axis from the periphery of the support portion and positioned beneath the support portion and support surface so as to support the support portion and support surface on the base portion and also the nose gear of an aircraft positioned on the support surface from below;
a torque sensor coupled to the base portion and to the support portion and operable to sense the torque between the base portion and support portion and to provide a sensor output signal corresponding to the sensed torque; and
an indicator responsive to the sensor output signal to indicate a condition wherein the sensor output signal corresponds to a torque that is at least of a first magnitude.

2. A tow according to claim 1 wherein the base portion comprises plural bearing receiving pockets each positioned to receive a portion of a respective bearing and wherein the support portion comprises plural bearing receiving recesses each positioned to receive a portion of a respective bearing; whereby the plurality of bearings are received into respective base portion pockets and support portion recesses to thereby reduce the height of the combined base portion, bearings and support portion.

3. A tow according to claim 2 wherein the plurality of bearings comprise roller bearings each pivotal about a respective bearing pivot axis, the bearing pivot axes being aligned along radiuses extending through the second pivot axis and a plurality of said bearings being positioned at locations spaced entirely inwardly from the periphery.

4. A tow according to claim 3 wherein at least two of said bearings are located along each of a plurality of radiuses.

5. A tow according to claim 4 wherein the only bearings supporting the support portion are positioned at a location spaced inwardly from the periphery and wherein a plurality of said bearings are positioned nearer to the second pivot axis than the periphery.

6. A tow according to claim 5 wherein the base portion comprises first and second plates, the pockets extending entirely through the first plate and the second plate closing the pockets from below, and wherein the support portion comprises third and fourth plates, the bearing receiving recesses extending entirely through the third plate and the fourth plate overlying the recesses and supported by projecting portions of the bearings extending upwardly through the recesses.

7. A tow according to claim 6 wherein the bearings each comprise a bearing pivot pin mounted to the underside of the third plate.

8. A tow according to claim 1 wherein the plurality of bearings comprise roller bearings each pivotal about a respective bearing pivot axis wherein there are a plurality of radiuses from the periphery of the support portion to the second pivot axis, and wherein there are a plurality of said bearings positioned along each radius with their respective bearing pivot axes aligned with the radius.

9. A tow according to claim 8 wherein at least two of said bearings are located along each of a plurality of radiuses.

10. A tow according to claim 9 wherein the indicator provides a first alert signal in the event the sensor output signal corresponds to a torque of at least a first magnitude that is less than the torque of a second magnitude, the indicator providing a second alert signal in the event the sensor output signal corresponds to a torque of at least the second magnitude.

11. A tow according to claim 10 wherein the indicator continues to provide the second alert signal following the reduction of torque indicated by the sensor output signal to correspond to a torque that is less than the second magnitude until the indicator is switched off by an individual other than an operator of the tow who is authorized to switch off the indicator.

12. A tow according to claim 11 wherein the indicator is selectively turned on or turned off.

13. A tow according to claim 12 comprising a nose gear holder, a nose gear coupler sensor coupled to the nose gear holder, and wherein the indicator is automatically turned on in response to the nose gear coupler sensor indicating the absence of the nose gear from the nose gear holder.

14. A tow according to claim 1 wherein the nose gear support portion comprises a front portion with a front edge, a back portion and first and second side portions, the support surface extending between the side portions and toward the front edge of the support portion, at least a plurality of said bearings being positioned forwardly of the second pivot axis and spaced entirely inwardly from the first and second side portions.

15. A tow for an aircraft having a nose gear comprising:
a vehicle;
an aircraft nose gear support assembly pivotally coupled to the vehicle for raising and lowering relative to the vehicle about a first pivot axis;
at least one actuator coupled to the vehicle and to the nose support assembly and operable to raise and lower the nose gear assembly about the first pivot axis;
the nose gear support assembly comprising;
a base portion;
a support portion comprising a periphery and a nose gear support surface for supporting an aircraft nose gear positioned thereon, the support portion being pivotally coupled to the base portion so as to be pivotal about an upright second pivot axis relative to the base portion;
a retainer supported by the base portion and positioned inwardly from the periphery of the support portion, wherein the second pivot axis extends through the retainer, and wherein the support portion is pivotal about the second pivot axis and about the retainer;
a plurality of bearings positioned inwardly toward the second pivot axis from the periphery of the support portion and positioned to support the support portion on the base portion; and
wherein the support portion is a nose gear support surface supported from below by a plurality of said bearings positioned below the support surface.

16. A tow according to claim 15 wherein the base portion comprises plural bearing receiving pockets each positioned to receive a portion of a respective bearing and wherein the support portion comprises plural bearing receiving recesses each positioned to receive a portion of a respective bearing; whereby the plurality of bearings are received into respective base portion pockets and support portion recesses to thereby reduce the height of the combined base portion, bearings and support portion.

17. A tow according to claim 16 wherein the plurality of bearings comprise roller bearings each pivotal about a respective bearing pivot axis, the bearing pivot axes being arranged to lie on radiuses extending through the second pivot axis.

18. A tow according to claim 17 wherein at least two of said bearings are located along each of a plurality of radiuses.

19. A tow according to claim 18 wherein the base portion comprises first and second plates, the pockets extending entirely through the first plate and the second plate closing the pockets from below, and wherein the support portion comprises third and fourth plates, the bearing receiving recesses extending entirely through the third plate and the fourth plate overlying the recesses and spaced from the bearings.

20. A tow according to claim 19 wherein the bearings comprise bearing pivot pins mounted to the underside of the third plate.

21. A tow for an aircraft having a nose gear comprising:

a vehicle;

an aircraft nose gear support assembly pivotally coupled to the vehicle for raising and lowering relative to the vehicle about a first pivot axis;

at least one actuator coupled to the vehicle and to the nose support assembly and operable to raise and lower the nose gear assembly about the first pivot axis;

the nose gear support assembly comprising;

a base portion comprising first and second base side walls, a base rear wall and a base bottom portion extending between the first and second base side walls;

a support portion comprising first and second support portion sidewalls, a support portion rear wall and a support portion bottom portion extending between the first and second support portion side walls, the support portion bottom portion comprising a periphery and being pivotally coupled to the base bottom portion so as to be pivotal about an upright second pivot axis relative to the base portion, the support portion comprising a nose gear supporting surface;

the base portion having a base portion opening through which the second pivot axis extends, the support portion bottom portion having a support portion opening through which the second pivot axis extends, the support portion also comprising a cover portion overlying the support plate portion opening, and a retainer positioned in the based portion opening and support portion opening, wherein the support portion is pivotal about the second pivot axis and the retainer; and a plurality of bearings positioned inwardly toward the second pivot axis from the periphery of the support portion and positioned to support the support portion on the base portion, a plurality of said bearings being positioned below the nose gear supporting surface;

the at least one actuator comprising a first cylinder coupled to the vehicle and the first base sidewall and a second cylinder coupled to the vehicle and to the second base side wall;

a torque sensor coupled to the base portion and to the support portion and operable to sense the torque between the base portion and support portion and to provide a sensor output signal corresponding to the sensed torque;

an indicator responsive to the sensor output signal to indicate a condition wherein the sensor output signal corresponds to a torque that is at least of a first magnitude;

wherein the base bottom portion comprises a first plate with plural bearing receiving pockets extending through the first plate and positioned to receive a portion of a respective bearing and a second plate closing off the pockets from below, and wherein the support portion comprises a third plate with plural bearing receiving recesses therethrough each positioned to receive a portion of a respective bearing and a fourth plate overlying the recesses and spaced from the bearings; whereby the plurality of bearings are received into respective base portion pockets and support portion recesses to thereby reduce the height of the combined base portion, bearings and support portion;

wherein the plurality of bearings comprise roller bearings each pivotal about a respective bearing pivot axis, the bearing pivot axes being arranged to lie on radiuses extending through the second pivot axis; and wherein the indicator provides a first alert signal in the event the sensor output signal corresponds to a torque of at least a first magnitude that is less than the torque of a second magnitude, the indicator providing a second alert signal in the event the sensor output signal corresponds to a torque of at least the second magnitude.

22. A tow according to claim 21 comprising a load sensor coupled to the nose gear support assembly and operable to provide an output signal representing the weight of an aircraft carried by the nose gear support assembly, the tow comprising an electric motor operable to drive the tow to move the aircraft in response to drive current, the tow also comprising at least one brake operable to apply a braking force to the tow to decelerate the tow, a controller having an input coupled to the load sensor and to the output signal representing the weight of the aircraft carried by the nose gear support assembly, the controller being operable to limit the maximum drive current and the maximum braking force to one of a plurality of maximum magnitudes based on the weight of the aircraft, there being at least four of said maximum drive current and maximum braking force magnitudes.

23. A tow according to claim 21 comprising a load sensor coupled to the nose gear support assembly and operable to provide an output signal representing the weight of an aircraft carried by the nose gear support assembly, the tow comprising an electric motor operable to drive the tow to move the aircraft in response to drive current, the tow also comprising at least one brake operable to apply a braking force to the tow to decelerate the tow, a controller having an input coupled to the load sensor and to the output signal representing the weight of the aircraft carried by the nose gear support assembly, the controller being operable to limit the maximum drive current and the maximum braking force to one of a plurality of maximum magnitudes based on the weight of the aircraft, the tow comprising a nose gear holder, a nose gear coupler sensor coupled to the nose gear holder, and wherein the nose gear coupler sensor provides an output signal indicating the absence of the nose gear from the nose gear holder, the controller being coupled to the nose gear coupler sensor and operable to set the maximum braking pressure to its lowest maximum magnitude in response to the absence of the nose gear from the nose gear holder.

24. A tow according to claim 21 comprising a winch mounted to the vehicle and comprising a winch strap for engaging the nose gear of the aircraft to roll the nose gear onto the upper surface of the fourth plate prior to raising the nose gear assembly.

\* \* \* \* \*